Sept. 17, 1963

H. FUEHRING 3,104,222

SOLVENT-WATER SEPARATOR TANKS FOR USE
IN CLEANING INSTALLATIONS

Filed Feb. 25, 1960

INVENTOR.
HEINRICH FUEHRING
BY
*Mestern & Kollin,*
ATTORNEYS

United States Patent Office 3,104,222
Patented Sept. 17, 1963

3,104,222
SOLVENT-WATER SEPARATOR TANKS FOR USE IN CLEANING INSTALLATIONS
Heinrich Fuehring, Augsburg, Germany, assignor to Max Boehler and Ferdinand Weber, trading as the firm Boehler & Weber Kommanditgesellschaft, Augsburg, Germany
Filed Feb. 25, 1960, Ser. No. 11,030
Claims priority, application Germany Feb. 28, 1959
2 Claims. (Cl. 210—207)

The invention concerns a water separator for use in cleaning plants adapted to separate a mixture of water and solvent.

Conventional separators are based on the concept of introducing the mixture into a tank, drawing off the solvent of heavier specific gravity from the bottom of the tank and allowing the lighter water to overflow out of the tank into a receiving pipe line.

These known separators have an inlet connection for the introduction of the mixture of solvent and water and two outlet connections, the latter including one connection for the separated solvent located on the bottom of the container and another outlet connection for the water located near the cover of the container.

Other conventional water separators have metal baffles inside the separator tank dividing the vessel into several compartments so that the mixture can be separated inside each compartment.

Experience has shown, however, that no satisfactory separation can be achieved by leaving the mixture as it is. It is always found that fine droplets of solvent are present in the separated water and very finely distributed droplets of water exist in the separated solvent, these fine droplets clinging so firmly to accompanying droplets of water or solvent, respectively, that they cannot participate in the separation. Thus it is not possible to recover entirely pure solvent and pure water.

An object of the present invention is to separate these very finely dispersed droplets inside the water separator.

According to the present invention, a water separator for use in cleaning plants includes a closed container with at least two baffle type partitions of fibrous material disposed transversely to the direction of flow of the mixture, a space being provided between the upper edges of the partitions and an upper wall or roof of the container for the overflow of the mixture when a partition is clogged.

A preliminary coarse separation of the solvent from the water is also achieved in that the heavier solvent is deposited on the bottom of the tank and the water on the upper side of the tank. The separation of the droplets in the dispersion is effected by the fibrous partitions on whose fibers the droplets are deposited and coalesce, i.e. combine to form comparatively large droplets in order then to participate in the coarse separation.

The partitions also produce another effect, because any fine particles of mud which have passed through the sludge filter may be deposited on the fibers of these partitions so that the separated liquids are free from entrained mud.

The individual partitions in the side walls of the container may be slidably removable, thus making it possible for any clogged partition to be very simply removed from the tank of the water separator and cleaned by spraying with a powerful jet of water. The guides for the individual partitions preferably comprise two L-shaped sections, secured to the side walls of the tank in a vertical position, between which the edge of the partition is held.

It is advisable to construct the individual partitions from several undulating layers of hydrophobic fibrous material which are encompassed between two perforated supporting plates. The undulating layers are preferably arranged in contact with each other in such manner that their corrugations coincide. Thus pockets are provided adjacent the fibrous body between the supporting plates yet no large cavities are formed within the fibrous body itself, the object of the invention being to convey the mixture of water and solvent past as many fibers as possible so that the finely dispersed droplets can settle securely on these fibers.

In one embodiment of the invention, one of the supporting plates is constructed from a trough-shaped portion of perforated material, such as sheet metal, which receives the fibrous body and whose open side may be spanned by means of a plane perforated plate. A sealing strip (for example of plastic or rubber) can be connected to the trough-shaped member and the plane plate in the region of a securing means whose marginal area projecting freely from the edges of the partition, becomes disposed with a sealing effect against the guides of the separator tank under the action of the flow pressure.

Experiment has proved it to be advantageous to make the undulating layers of fibers impregnated with phenol resin. This phenol-resin impregnation is particularly suitable for bonding the fibers and to impart sufficient rigidity thereto so that the partitions can be conveniently treated; it also renders the fibers water repellent. Instead of such coated fibers one can also use other light-weight panels in which the material is of a fibrous and hydrophobic nature, glass fibers being a suitable example.

The outlet of the supply pipe for the mixture can be enclosed by a basket-like sieve preferably arranged inside the separator tank.

It is possible to connect the separator tank in series with an additional tank comprising at least one baffle-like partition by which the separated solvent can be separated again from the residual water components. The function of this additional tank is the same as that of the water-separator tank, the only difference being that this additional tank receives the solvent which is already separated in the main tank and is to be freed only of the finely dispersed water droplets.

It is also advisable to provide the surface of the base of the individual separator tank with a hygroscopic layer such as rock salt by which a certain percentage of the water content is retained along the tank bottom over which a flow of progressively concentrated solvent passes below the partitions.

An additional conduit may empty into the separator tank preferably in the region between two partitions, the additional conduit communicating, for example, with the condenser of a distilling container of the cleaning plant. Thus it is possible also to separate those solvent and water mixtures in the water separator which have not passed through the cooler of the cleaning plant.

The invention will be described further, by way of example, with reference to the accompanying drawing, in which.

Figures 1, 2, 3:
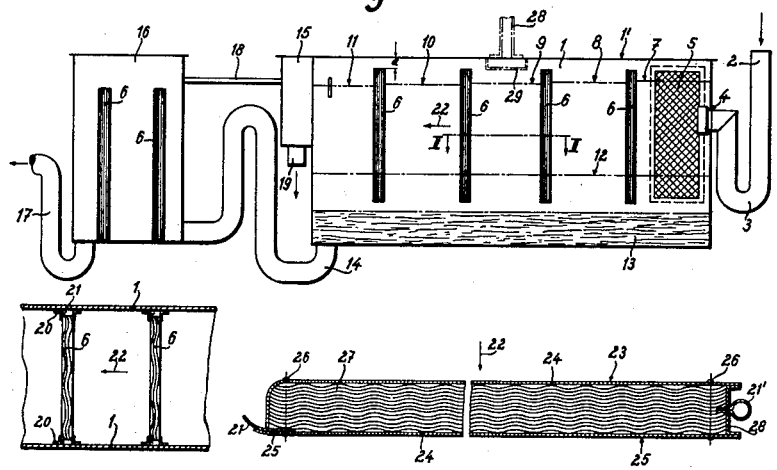
FIG. 1 is a schematic cross-section through a water separator constructed in accordance with the present invention.
FIG. 2 is a schematic axial section through individual partitions and the guide thereof in the separator tank.
FIG. 3 is a cross-section through an individual partition.

A mixture of water and solvent coming, for example, from the filter of a cleaning plant is introduced through a conduit 2, a siphon 3 and a connecting socket 4 into a water-separator tank 1. The outlet of this socket 4 is enclosed by a cage-like sieve 5 which prevents the entry of any coarse fouling, slubs and the like into the separator tank 1. The mixture then reaches a first partition 6, extending transversely to the direction of flow of the mixture as far as the sides of the tank 1. These partitions 6 may either rest on the bottom of the tank or be spaced from the bottom of the tank as shown, to insure continued solvent recovery even if a partition should become clogged. A layer of hygroscopic material 13, such as rock salt, is provided on the bottom of the tank. Other partitions 6 are provided which extend similarly to the first partition 6 at spaced intervals from the first partition 6. A space $a$ left between the upper edges of the partitions 6 and the roof 1' of the tank, enables the mixture or the separated water to flow over any of the partitions 6 when they are clogged. However, as long as the partitions 6 are not clogged, a gradient of fluid, as shown by the levels 7, 8, 9, 10 and 11 of the water, is formed on account of the flow resistance of these partitions 6.

The partitions 6 are of fibrous material whose fibers are intended to collect the droplets finely distributed in the mixture or in the already separated water and solvent in such manner that they can combine to form larger droplets in order then to participate in the separation of the mixture into its components. Since the water is lighter than the solvent, the water is accumulated as it flows through the separator 1, above the solvent. The solvent is conveyed through an outlet conduit 14 which is connected to the bottom of the separator 1. The water flows through an overflow compartment 15 into a water outlet conduit 19.

Even if the separated solvent is to be freed very carefully from dispersed water components, it is advisable to provide an additional container 16, connected to the separator tank 1, into which solvent is introduced from below through the conduit 14. This additional container 16 has at least one partition 6 on which the finely dispersed water droplets are deposited and finally coalesce to form larger drops and then rise. The water settling on top of the solvent can return through a connecting pipe 18 to the overflow compartment 15. The perfectly purified solvent is then removed through a pipe line 17.

In FIG. 1 there is also shown that an additional pipe connection 28 can be provided through which a solvent mixture removed from the condenser or the distilling vessel, sludge filter or the like can flow to the separator tank 1 in the region between two partitions 6. It is advantageous to provide, in the region of the outlet of the supply conduit 28, a sieve-like cage 29 in which coarse mud components can be retained.

As shown in FIG. 2, the individual partitions 6 are displaceably arranged in the side walls of the separator tank 1. For this purpose angle guide rails 20 are disposed on side walls of the tank between which the edges of the partition 6 are guided. These partitions 6 can be drawn out of the top of the separator tank 1 without the need for special securing means.

An individual partition 6 is shown in an enlarged scale in FIG. 3. This partition 6 comprises two supporting plates 23 and 25 which are connected together in the manner of a holder of which the part 23 is dish-shaped or trough-shaped. These partition members 23 and 25 are preferably made of sheet metal and are provided with perforations 24 so that the mixture flowing in the direction of the arrow 22 can pass through them. The part 25 is plate-shaped; it is rigidly or detachably connected to the dish-shaped part 23 by means of connecting elements 26. Strip-like sealing means 21 of plaster or rubber, for example, the free end of which projects beyond the dish-shaped member 23, are disposed between the members 23 and 25 on the edges of the partitions 6.

As shown in FIG. 2, each individual sealing strip 21 is disposed in contact with a guide 20 and, if desired, also with the side wall of the separator tank 1 and the partitions 6 are placed in position so that the flow pressure in the direction of the arrow 22 forces the sealing strips 21 against the guides 20. This prevents the flowing of any mixture through the guides 20 of the partitions 6. A variation in the method of sealing is illustrated on the right-hand side of FIG. 3 in which a sealing profile 21' is inserted into a U profile 28 which serves simultaneously as a spacer for the partition members 23 and 25.

The holder-like partition shell 23, 25 encloses as many layers 27 as desired of fibrous material, the purpose of which is to promote the coalescence of droplets of dispersed water in the mixture. It has been determined that the very fine dispersion droplets become deposited on the fibers of the layers 27 and coalesce to form larger drops which thereupon can participate in the separation. It has proved to be an advantage to coat the layers 27 of fibers, such as glass fibers, with phenol resin in accordance with the manufacture of light weight panels, the advantage being achieved by the phenol-resin impregnations that the plates simultaneously become very resistant. It is advisable to make the individual layers 27 corrugated and to superimpose several of these layers 27 so that their profiles coincide. By virtue of the corrugated shape it is possible to arrange the largest possible number of fibers within the partition members 23, 25. It is also possible to use layers 27 which are finely felted together. The corrugation of the fiber layers results in the formation of pockets next to the perforated supporting plates 23, 25 in which liquid can accumulate within the shell; this, in turn, makes it easier for the liquid to permeate the body composed of undulating layers 27 of fibrous hydrophobic material.

I claim:

1. A device for separating a mixture of water and a heavier solvent into its components, comprising a tank with an inlet for said mixture at one end and with two outlets at the other end including an upper outlet for water and a lower outlet for the solvent, said tank having a roof and a bottom; a plurality of substantially vertical partitions including liquid-permeable layers of hydrophobic fibers, said partitions being serially disposed between said ends and extending completely across said tank between two levels spaced from said roof and said bottom, thereby forming an overflow path for said mixture upon a clogging of said layers; and a layer of hygroscopic material disposed on said bottom below said partition.

2. A device for separating a mixture of water and a heavier solvent into its components, comprising a tank with an inlet for said mixture at one end and with two outlets at the other end including an upper outlet for water and a lower outlet for the solvent, and a plurality of substantially vertical partitions serially disposed between said ends and extending completely across said tank at least between two intermediate levels thereof, each of said partitions including two perforated upright supporting plates spaced apart in the direction of liquid flow and encompassing a body of undulating fibrous layers of hydrophobic material, said body forming pockets for liquid within each partition adjacent the supporting plates thereof.

References Cited in the file of this patent

UNITED STATES PATENTS

| | | |
|---|---|---|
| 1,108,037 | Warden | Aug. 18, 1914 |
| 1,812,401 | Goulding | June 30, 1931 |
| 2,229,610 | Nicholoy | Jan. 21, 1941 |
| 2,720,937 | Root | Oct. 18, 1955 |
| 2,795,591 | Bente | June 11, 1957 |

FOREIGN PATENTS

| | | |
|---|---|---|
| 266,857 | Great Britain | Mar. 10, 1927 |